(12) United States Patent
Luo et al.

(10) Patent No.: US 11,847,126 B1
(45) Date of Patent: Dec. 19, 2023

(54) METHOD AND APPARATUS FOR DATA FILTERING

(71) Applicant: National University of Defense Technology, Changsha (CN)

(72) Inventors: Lailong Luo, Hunan (CN); Deke Guo, Hunan (CN); Pengtao Fu, Hunan (CN); Shangsen Li, Hunan (CN); Yiting Chen, Hunan (CN)

(73) Assignee: National University of Defense Technology, Changsha (CN)

( * ) Notice: Subject to any disclaimer, the term of this patent is extended or adjusted under 35 U.S.C. 154(b) by 0 days.

(21) Appl. No.: 18/212,001

(22) Filed: Jun. 20, 2023

(30) Foreign Application Priority Data

Sep. 30, 2022 (CN) .......................... 202211210816.8

(51) Int. Cl.
*G06F 16/00* (2019.01)
*G06F 16/2457* (2019.01)
*G06F 16/22* (2019.01)
*G06F 16/28* (2019.01)

(52) U.S. Cl.
CPC .... *G06F 16/24578* (2019.01); *G06F 16/2255* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 10,558,633 B1* | 2/2020 | Kim ..................... | G06F 16/2255 |
| 2017/0041333 A1* | 2/2017 | Mahjoub ............. | H04L 61/4511 |
| 2019/0266252 A1* | 8/2019 | Breslow .............. | G06F 16/2255 |
| 2021/0034674 A1* | 2/2021 | Palsetia .............. | G06F 16/9017 |

\* cited by examiner

*Primary Examiner* — Anhtai V Tran (57) ABSTRACT

A method and an apparatus for data filtering are provided in this disclosure. The method is applied to a filtering system, including m buckets, each bucket including b storage slots, and each storage slot including a first domain and a second domain. The first domain is configured for recording fingerprint information of an element fingerprint of a data element, and the second domain is configured for matching and recording identifiers corresponding to the fingerprint information stored in the first domain. The method includes: determining an element fingerprint of a data element to be processed in response to an obtained target instruction; and performing a target operation on the data element based on at least the element fingerprint and stored information of the first domain and the second domain in each storage slot. The target operation at least includes one or more of inserting, querying and deleting operations.

10 Claims, 4 Drawing Sheets

METHOD AND APPARATUS FOR DATA FILTERING

CROSS-REFERENCE TO RELATED APPLICATIONS

This application claims priorities from the Chinese patent application number 202211210816.8 filed Sep. 30, 2022, the content of which is incorporated herein in the entirety by reference.

TECHNICAL FIELD

Embodiments of the disclosure relate to the technical field of computers, in particular to a method and apparatus for data filtering.

BACKGROUND

At present, big data has general characteristics of super-large volume and low data value density. These characteristics bring great challenges to storage, transmission, processing and query of large-scale data. Therefore, a variety of space-efficient data summary structures are proposed to represent a large-scale data set and to support a querying function with constant time complexity. Typical data summary structures involve Bloom filter, cuckoo filter, quotient filter, Count-Min and variants thereof. For these data summary structures, a hash function is generally adopted to map data elements to one or more positions of a hash table or a bit vector. Subsequently, information related to the data elements can be recorded by bits, counters or fingerprints corresponding to these positions. For example, a membership query technology based on the data summary (to answer a question whether a given data element belongs to a given data set) is widely used in caching, routing, privacy protecting, data synchronization and other fields.

Different methods may be adopted for the data summary structure to realize diversified functions. For the Bloom filter, h independent hash functions are used to map data elements to h positions of a bit vector initialized to 0. Subsequently, bits at these positions will be set to 1 so as to indicate membership information of the data element. In subsequent querying, only checking on these bits are required. By contrast, for the cuckoo filter, a hash table that includes m buckets each with b storage slots is used to directly stores fingerprint of the data elements. By providing two candidate buckets for each data element, high space utilization can be realized for the cuckoo filter. In addition to membership query, more domains are introduced into the cuckoo filter and Bloom filter (such as counters, checksums, flags, etc.) to improve performance and enable diversified functions.

The cuckoo filter is considered to be more efficient than the Bloom filter. However, pursuit on space efficiency, accuracy and high throughput in data summary has never stopped. For any data element x, when both candidate buckets are completely occupied, stored fingerprint of one of the both candidate buckets can be randomly extracted and fingerprint of the data element x is placed into this empty storage slot in the cuckoo filter. However, the extracted fingerprint $\eta x$ of the data element may be tried to be stored in another candidate bucket. A kick-out and restoring operation described above may be repeated for max times to achieve a purpose of high space utilization. A candidate bucket index value of the data element x can be calculated in a following manner $h_1(x)=hash(x)$, $h_2(x)=h_1(x) \oplus hash(\eta x)$. In the cuckoo filter, one hash calculation and one XOR operation are required each time fingerprint of a data element is redistributed. Such computational overhead may undoubtedly have negative impact on insertion throughput, especially when a cuckoo filter space has been highly utilized. Therefore, a lightweight data fingerprint redistribution strategy is essential to further improve throughput of the cuckoo filter.

In addition, a length (bucket number m) of the cuckoo filter must be strictly set to be $m=2^c$ and c is larger than 1 and is in an integer form. Otherwise, overflowing may occur for the XOR operation. Lack of design flexibility makes the cuckoo filter either be in a low utilization state or unable to successfully represent a given number of data elements in practical use. For example, given that b is equal to 4, if there are 520 data elements to be represented and if a length of the cuckoo filter is 256, large space waste may be caused; and if the length is set to be 128, enough storage slots cannot be provided to represent these data. To this end, in order to achieve more reasonable space utilization, there is an urgent need for a flexible design mechanism in which a storage capacity is in direct proportion to a data volume.

Finally, complex big data analysis tasks generally require data summary to support other functions besides the membership query. Typical functions include dynamic representation (capacity flexibility), cardinality estimation, frequency estimation, top-k query, and the like. However, such diverse functions cannot be achieved for existing data summary, and related discussion and generalization work are absent. For example, Bloom filter, counting Bloom filter and dynamic Bloom filter can serve to realize the membership query, element insertion or dynamic representation, but they can't support above functions at the same time and a data structure that can realize the above functions at the same time is still lacking. This problem also exists in the cuckoo filter and dynamic cuckoo filter. In other words, there is a practical need to study a data summary structure that involves diversified functions at the same time to support big data analysis.

SUMMARY

A method for data filtering is provided in an embodiment of the disclosure, which is applied to a filtering system. The filtering system includes m buckets, each bucket including b storage slots, and each storage slot including a first domain and a second domain. The first domain is configured for recording fingerprint information of an element fingerprint of a data element, and the second domain is configured for matching and recording identifiers corresponding to the fingerprint information stored in the first domain. The method for data filtering includes:

determining an element fingerprint of a data element to be processed in response to an obtained target instruction; and     performing a target operation on the data element based on at least the element fingerprint and stored information of the first domain and the second domain in each storage slot, the target operation at least including one or more of inserting, querying and deleting operations.

As an alternative embodiment, the fingerprint information is a quotient value and a remainder value calculated based on a filtering length of the filtering system, and the quotient value and the remainder value corresponding to a same data element are stored in different candidate buckets respectively.

As an alternative embodiment, the target operation is an inserting operation.

the performing the target operation on the data element based on at least the element fingerprint and stored information of the first domain and the second domain in each storage slot includes:

determining the quotient value and the remainder value of the data element based on the element fingerprint and the filtering length;

directly storing the data element in an empty storage slot when there is the empty storage slot in the filtering system, and updating a corresponding first domain and second domain based on the quotient value and the remainder value; or randomly kicking out data in the storage slot so as to store the data element in a vacated storage slot when there is no empty storage slot in the filtering system;

redirecting a kicked-out data element to a new storage slot and storing it, and dynamically adjusting values of the corresponding first domain and second domain at the same time, the new storage slot being formed by kicking out data in another storage slot; and repeating above operations until all data are stored to a maximum extent.

As an alternative embodiment, the target operation is a querying operation.

the performing the target operation on the data element based on at least the element fingerprint and stored information of the first domain and the second domain in each storage slot includes:

determining the quotient value and the remainder value of the data element based on the element fingerprint and the filtering length;

querying a first domain and a second domain stored with the quotient value and the remainder value in the filtering system based on the quotient value and the remainder value; and determining the candidate buckets for storing the data element based on a query result.

As an alternative embodiment, the target operation is a deleting operation.

the performing the target operation on the data element based on at least the element fingerprint and stored information of the first domain and the second domain in each storage slot includes:

deleting data stored in the candidate bucket after determining the candidate bucket in which the data element is stored.

As an alternative embodiment, the target operation further includes an operation of filtering compression or filtering merging of two homogeneous filtering systems.

the method further includes:

determining storage capacity of the two homogeneous filtering systems; and representing data in a filtering system with a relatively small storage capacity in a storage form of a filtering system with a relatively large storage capacity, and performing corresponding storage.

As an alternative embodiment, the target operation further includes a filtering deduplication operation for deduplication of same storage elements in two homogeneous filtering systems, and a filtering intersection operation for finding data intersection of entities of or parts of the two filtering systems.

As an alternative embodiment, the method further includes:

pre-judging a future storage capacity of the filtering system; and increasing a number of storage slots in parts or all of the buckets based on at least the storage capacity.

As an alternative embodiment, each of the storage slots further includes a third domain for recording a frequency of occurrence of a corresponding data element.

the method further includes:

accordingly adjusting a value of the third domain based on a type of the target operation.

Meanwhile, an apparatus for data filtering is provided in another embodiment of the disclosure, which is applied to a filtering system. The filtering system includes m buckets, each bucket including b storage slots, and each storage slot including a first domain and a second domain. The first domain is configured for recording fingerprint information of an element fingerprint of a data element, and the second domain is configured for matching and recording identifiers corresponding to the fingerprint information stored in the first domain. The apparatus for data filtering includes:

a determination module for determining an element fingerprint of a data element to be processed in response to an obtained target instruction; and an execution module for performing a target operation on the data element based on at least the element fingerprint and stored information of the first domain and the second domain in each storage slot, the target operation at least including one or more of inserting, querying and deleting operations.

Other features and advantages of the disclosure will be set forth in following description, and in part will be obvious from the description, or may be learned by implementation of the disclosure. Objects and other advantages of the present application may be realized and obtained by the structure particularly proposed in the written specification and claims, as well as the drawings.

Technical schemes of this disclosure will be described in further detail through the drawings and embodiments.

BRIEF DESCRIPTION OF THE DRAWINGS

The accompanying drawings are provided for further understanding of the disclosure and constitute a part of the specification, and together with embodiments of the disclosure, serve to explain the disclosure and do not constitute limitation on the disclosure. In the drawings.

DETAILED DESCRIPTION

Specific embodiments of the present disclosure will be described in detail in the following with reference to the drawings, which are not taken as limitations on the present disclosure.

It should be understood that various modifications can be made to the embodiments disclosed herein. Therefore, the following description should not be regarded as limitation, but only as instances of embodiments. Other modifications within a scope and spirit of the present disclosure will occur to those skilled in the art.

The accompanying drawings, which are included in and constitute a part of the specification, illustrate embodiments of the disclosure, and together with general description of the disclosure given above and detailed description of the embodiments given below, serve to explain principles of the disclosure.

These and other features of the present disclosure will become apparent from the following description of preferred forms of embodiments given as non-limiting examples with reference to the accompanying drawings.

It should also be understood that although the disclosure has been described with reference to some specific examples, those skilled in the art can definitely realize many other equivalent forms of the disclosure, which have features as claimed and therefore are all within the scope of protection defined thereby.

The above and other aspects, features and advantages of the present disclosure will become more apparent in view of the following detailed description when taken in conjunction with the accompanying drawings.

Hereinafter, specific embodiments of the present disclosure will be described with reference to the accompanying drawings. However, it should be understood that the disclosed embodiments are only examples of the present disclosure, which can be implemented in various ways. Well-known and/or repetitive functions and structures have not been described in detail to avoid obscuring this disclosure with unnecessary or redundant details. Therefore, specific structural and functional details disclosed herein are not intended to be limiting, but only as a basis and representative basis of claims for teaching those skilled in the art to variously use the disclosure in any virtually suitable detailed structure.

This specification can use the phrases "in one embodiment", "in another embodiment", "in yet another embodiment" or "in other embodiments", which can all refer to one or more of the same or different embodiments according to the present disclosure.

Hereinafter, embodiments of the present disclosure will be described in detail with reference to the drawings.

Figure 1:
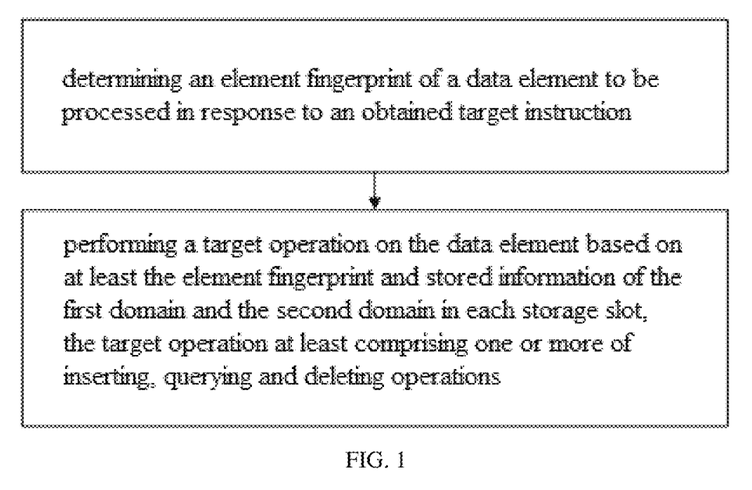
FIG. 1 is a flowchart of a method for data filtering according to an embodiment of the present disclosure.

As shown, a method for data filtering is provided in an embodiment of the disclosure, which is applied to a filtering system. The filtering system includes m buckets, each bucket including b storage slots, and each storage slot including a first domain and a second domain. The first domain is configured for recording fingerprint information of an element fingerprint of a data element, and the second domain is configured for matching and recording identifiers corresponding to the fingerprint information stored in the first domain. The method for data filtering includes:

determining an element fingerprint of a data element to be processed in response to an obtained target instruction; and performing a target operation on the data element based on at least the element fingerprint and stored information of the first domain and the second domain in each storage slot, the target operation at least including one or more of inserting, querying and deleting operations.

The fingerprint information is a quotient value and a remainder value calculated based on a filtering length of the filtering system, and the quotient value and the remainder value corresponding to a same data element are stored in different candidate buckets respectively.

Figure 2:
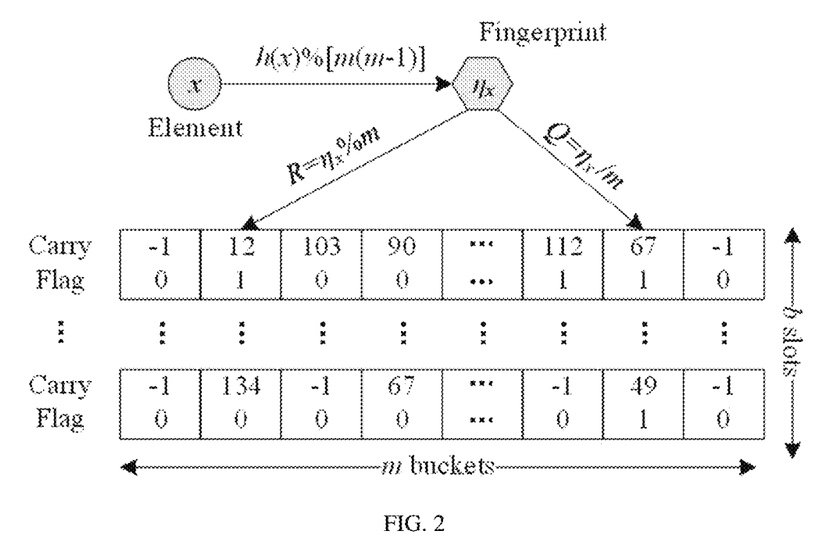
FIG. 2 is a schematic diagram of a filtering system according to an embodiment of the present disclosure.

For example, the filtering system consists of m buckets, and each bucket contains b storage slots. Each storage slot includes, but is not limited to, two domains, namely a first domain and a second domain. In this embodiment, the first domain and the second domain are called a Carry domain and a Flag domain respectively. The Carry domain is responsible for recording the fingerprint information of the element fingerprint of the data element, such as the quotient value or the remainder value. The fingerprint information is a quotient value and a remainder value calculated based on a filtering length of the filtering system. For example, a length of m buckets is the filtering length, which can be recorded as m. The Flag domain can be one bit to explicitly mark whether the storage slot records a quotient part (to set a Flag position to be 1) or a remainder part (to keep the Flag position to be 0), that is, to characterize a specific category of recorded fingerprint information based on different numerical values. For any empty storage slot, its Carry domain is set to be −1, and its Flag domain is set to be 0. For any data element x, a hash function h(x) can be configured to generate its element fingerprint $\eta_x$, and a value range of the element fingerprint is [0, m(m−1)].

In filtering of the filtering system in this embodiment, only a part of information of the element fingerprint is stored, which is either its quotient value or its remainder value. Further, in the filtering of this embodiment, a candidate bucket index of the data element is determined by calculating the obtained quotient value and remainder value. Specifically, the quotient value and remainder value (recorded as Q and R respectively) are calculated as follows:

$$Q_x = \eta_x / m$$

$$R_x = \eta_x \% m$$

Further, when the target operation is an inserting operation, performing the target operation on the data element based on at least the element fingerprint and stored information of the first domain and the second domain in each storage slot includes:

determining a quotient value and a remainder value of the data element based on the element fingerprint and the filtering length;

directly storing the data element in an empty storage slot when there is the empty storage slot in the filtering system, and updating a corresponding first domain and second domain based on the quotient value and the remainder value; or randomly kicking out data in the storage slot so as to store the data element in the vacated storage slot when there is no empty storage slot in the filtering system;

redirecting a kicked-out data element to a new storage slot and storing it, and dynamically adjusting values of the corresponding first domain and second domain at the same time, the new storage slot being formed by kicking out data in another storage slot; and repeating above operations until all data are stored to a maximum extent.

For example, the inserting operation for any data element x needs to follow two basic principles: 1) information of the element x can only be stored in a storage slot in its candidate bucket; 2) the filtering system stores $Q_x$ in a bucket $AF[R_x]$ or $R_x$ in $AF[Q_x]$. A specific algorithm involves the filtering system firstly calculating the fingerprint $\eta_x$ of the data element x, and the quotient value $Q_x$ and the residual value $R_x$ with parameters being set. If there is an empty storage slot in $AF[R_x]$ or $AF[Q_x]$, $Q_x$ or $R_x$ will be stored in it, and a Carry domain and Flag domain in this storage slot will also be given corresponding values. Otherwise, the filtering system will randomly kick out an element quotient value (if the Flag domain is 0) or remainder value (if the Flag domain is 1) stored in a storage slot from the two candidate buckets $AF[R_x]$ and $AF[Q_x]$, so as to provide space for storing the information of element x. The kicked-out element may be redirected to another candidate bucket. If the candidate bucket has an empty storage slot, a corresponding remainder value or quotient value can be successfully stored and the algorithm will return true; otherwise, a stored data element in the candidate bucket may be kicked out and a last kicked out data element can be stored in it. An above kick-out and restoring process is repeated to explore more candidate buckets, in order to finally find an empty storage slot and not generate new victims, that is, kicked-out data. The above process is performed max times at most. In this process, the Flag domain in the storage slot needs to be dynamically updated according to whether the Carry domain stores the quotient value or the remainder value. It is noted that if the filtering system returns information of insertion failure, it means that the filtering system is full and cannot continue to inserting new data elements. In this embodiment, time complexity of inserting a data element is O(b×max), because redistribution can be performed max times at most and b storage slots can be queried at most for each redistribution.

That is, in the filtering system of this embodiment, if a corresponding residual value $R_x$ of a data element is successfully stored by a bucket with an index value of $Q_x$, or its quotient value $Q_x$ is successfully stored by a bucket with an index value of $R_x$, it can be considered that it is successfully stored. In order to address hash collision and improve space utilization, a kick-out and restoring strategy is still adopted for the filtering system of this embodiment. Specifically, if any one of the two candidate buckets has an empty storage slot, the information of the element x will be stored in the empty storage slot. However, if both candidate buckets are completely occupied, a stored quotient value (if a Flag domain of the storage slot is 0) or a remainder value (if a Flag domain of the storage slot is 1) is randomly kicked out in Ark filter. The empty slot can be configured to store a newly added data element, while the extracted element may be marked as a victim and it is tried to search for an empty slot in another candidate bucket. If the above kick-out and restoring process can realize that no new victim is generated, it is considered that storage is successful, otherwise the kick-out and restoring will repeated for preset max times.

The filtering system of this embodiment essentially relies on the above framework to realize multiplexing of fingerprint information of elements and index information of a bucket for storing the elements. Based on this method, only one hash calculation is required for each data insertion. In addition, a fingerprint value range of data elements is set to be within [0, m(m−1)] so as to ensure that overflowing does not occur in a calculated quotient value and remainder value.

Further, when the target operation is a query operation, performing the target operation on the data element based on at least the element fingerprint and stored information of the first domain and the second domain in each storage slot includes:

determining a quotient value and a remainder value of the data element based on the element fingerprint and the filtering length;

querying a first domain and a second domain stored with the quotient value and the remainder value in the filtering system based on the quotient value and the remainder value; and determining the candidate bucket for storing the data element based on a query result.

For example, when querying membership of the data element x, the filtering system first calculates its element fingerprint $\eta_x$ and indexes $Q_x$ and $R_x$ of its two candidate buckets, that is, a quotient value and a remainder value of a corresponding element fingerprint. Then, the filtering system is only required to query two candidate buckets with their quotient values and remainder values stored therein. Specifically, if there is a slot of which a Flag domain is exactly 1 in a candidate bucket $AF[Q_x]$, the filtering system considers that the element x belongs to a target set and True is returned. Alternatively, if the filtering system finds that $Q_x$ exists in a Carry domain of a slot in the bucket $AF[R_x]$ and a Flag domain of the slot is 0, then True is also returned in the Ark filter. Different from a previous way of directly checking fingerprint elements, the filtering system in this embodiment checks whether the quotient value is stored in the candidate bucket. The candidate bucket is indexed with the remainder value, and can only be determined if the Flag domain is a corresponding value, and vice versa. Time complexity of membership querying is still constant, because only two candidate buckets can be accessed and checked.

Further, when the target operation is a deleting operation, performing the target operation on the data element based on at least the element fingerprint and stored information of the first domain and the second domain in each storage slot includes:

deleting data stored in the candidate bucket after determining the candidate bucket in which the data element is stored.

For example, to delete the data element x, it should be ensured for the filtering system whether the data element x has been stored and represented before. Specifically, after determining that the data element x has been stored and represented before, the filtering system firstly calculates the fingerprint, quotient value and remainder value of the data element x, and then tries to delete quotient information $Q_x$ from a bucket with an exact index $R_x$, and vice versa. Before deletion, a corresponding Flag domain must be checked to ensure that a correct element is deleted in the Ark filter. If the deletion is successful, the filtering system will return True; otherwise, it will return False to indicate that the data element x has not been stored before. Time complexity of element deletion is also at a constant level.

Further, the target operation in this embodiment further includes an operation of filtering compression or filtering merging of two homogeneous filtering systems.

The method in this embodiment further includes:

determining storage capacity of the two homogeneous filtering systems; and representing data in a filtering system with a relatively small storage capacity in a storage form of a filtering system with a relatively large storage capacity, and performing corresponding storage.

For example, the homogeneous filtering systems can be two homogeneous filtering systems with given same parameters m and b, which can be recorded as $AF_A$ and $AF_B$ respectively for example. Filtering compression refers to combining two filtering systems into one filtering system to represent all of fingerprint elements. Specifically, assuming that $AF_A$ stores more elements than $AF_B$, fingerprint in $AF_B$ can be tried to be represented using $AF_A$ in a compression operation. If all of the fingerprint in $AF_B$ can be successfully inserted into $AF_A$, the filtering system returns True, otherwise it returns False. In this way, the updated $AF_A$ may record all of elements in a union $A \cup B$. The compression operation can be realized if and only if $|A|+|B|$ is less than capacity of $AF_A$. In addition, when multiple filtering systems are maintained to represent a dynamic set with elements added or removed dynamically, a compression algorithm can be configured to recover sparse filtering systems. This function is very important for scenarios where a space of the filtering system is scarce. Time complexity of the compression operation is $O(m \times b)$.

Further, the target operation in this embodiment further includes a filtering deduplication operation for deduplication of same storage elements in two homogeneous filtering systems, and a filtering intersection operation for finding data intersection of entities of or parts of the two filtering systems.

For example, when filtering deduplication is performed, given two homogeneous filtering systems $AF_A$ and $AF_B$, subtracting $AF_A$ from $AF_B$ means removing common elements shared by them from $AF_B$. For any storage slot in $AF_A$, namely $AF_A[i][j]$, if its Carry domain is not $-1$, this slot is not empty and stores an element. Then searching is made for this element from $AF_B$. If $AF_A[i][j]$·Carry can be found in $AF_B[i]$ and Flag domains of these two slots are equal, or i can be found in $AF_B[AF_A[i][j]$·Carry$]$ and a Flag domain of this slot is $AF_A[i][j]$·Flag, then the element is considered as a common element and removed from $AF_A$. After traversing the whole $AF_A$ and emptying necessary slots, $AF_A$ only contains elements in A-B. Accordingly, by subtracting $AF_A$ from $AF_B$, $AF_B$ will only store elements in B-A. Time complexity of the filtering deduplication operation is also $O(m \times b)$.

As another example, filtering intersection, that is, finding intersection, is also a basic operation between two given sets, just like an operation between homogeneous filtering systems. For the above-described filtering systems $AF_A$ and $AF_B$, finding intersection of them refers to deriving recorded common elements/fingerprints of them. For this reason, in this embodiment, only a filtering system that stores less fingerprint elements, such as $AF_A$, is checked. If a fingerprint $\eta_t$ in $AF_A$ does not exist in $AF_B$, $\eta_t$ will be removed from $AF_A$. Then the algorithm returns an updated $AF_A$ as the intersection, which only stores elements in $A \cap B$. Time complexity of this operation is $O(m \times b)$.

The filtering systems can also support a filtering-level operation between heterogeneous filtering systems, as long as these filtering systems use a same fingerprint size and hash function. In this scenario, the filtering system needs to comprehensively consider the Carry domain, the Flag domain and an index value of a bucket in which it is located so as to derive initial fingerprint of an element in a certain form, which is specifically implemented as follows.

$$\eta_t = \begin{cases} \text{Carry} \times m + \text{index}, & \text{if Flag} = 0 \\ \text{index} \times m + \text{Carry}, & \text{if Flag} = 1 \end{cases}$$

According to above formula, in querying $\eta_t$ (the initial fingerprint) in another filtering system, candidate buckets can be directly located with $\eta_t$. Therefore, the above filtering compression, filtering deduplication and filtering intersection can also be realized among heterogeneous filtering systems.

Further, in determining the candidate bucket, the filtering system of this embodiment only relies on a hash function to derive the fingerprint, and derives the candidate bucket according to the fingerprint. Randomness of the fingerprint ensures randomness of the candidate bucket. For an element x, $Q_x = R_x$. In this case, x can only be stored in this bucket. For a bucket with an index i, this special situation will occur if and only if $\eta_x = i \times m + i$. Therefore, for a whole data structure, probability that N elements have 2 different candidate buckets is:

$$\frac{\binom{m(m-1)-m}{N}}{\binom{m(m-1)}{N}} = \frac{\binom{m(m-2)}{N}}{\binom{m(m-1)}{N}}$$

In addition, in this embodiment, when b=2, space utilization rate of a data structure has high probability of reaching about 90%. Therefore, with a given space, b=2 is maintained in the filtering system, which can ensure a large m (a length of the filtering system), thus ensuring a lower false positive rate. Accordingly, when n is known, a length of the Ark filter is calculated as $m = (b \times n)/T$, where b=2 and $T \approx 1.80$, so as to save space and ensure successful representation of elements with high probability. A length of the filtering system in this embodiment can be set to any integer as required, which is more flexible and adaptable.

Further, when multiple homogeneous data structures/filtering systems are maintained, an index of an element in the first data structure is also applicable to other data structures, that is, with a same index. Because there is dependency between the element fingerprint and a length of the data structure/a length of the filtering system (m), the filter system must access the element content of the element x and calculate respective element fingerprint of the element x in the two data structures in order to check whether the element x exists, if the two data structures are maintained with $m_1$ and $m_2$ ($m_1 \neq m_2$) buckets respectively. In contrast, if $m_1 = m_2$, original content of an element is accessed only once so as to achieve information multiplexing of the fingerprint and the index of the candidate bucket. Therefore, for the filtering system in this embodiment, it is preferred to add $\Delta b$ empty slots to the bucket while maintaining m same.

Specifically, the method in this embodiment further includes:
pre-judging a future storage capacity of the filtering system; and
increasing a number of storage slots in parts or all of the buckets based on at least the storage capacity.

Figure 3:
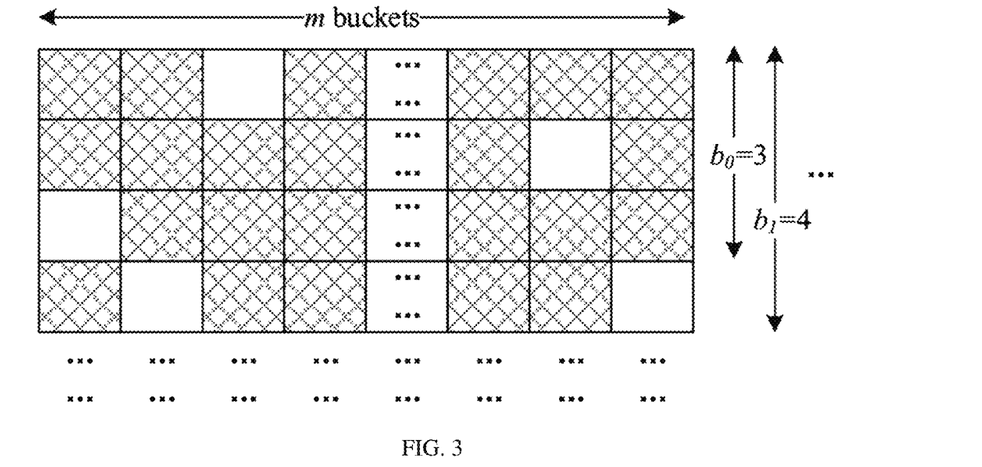
FIG. 3 is another schematic diagram of a filtering system according to an embodiment of the present disclosure.

For example, core idea of the filtering system in this embodiment is to increase capacity by adaptively increasing b. A number of added empty slots $\Delta b$ is determined by an expected number of future elements. $\Delta b$ can be reasonably set to represent all of upcoming elements in the filtering system with high probability. FIG. 3 shows a simple example of a filtering system. An initial filtering system has three slot arrays ($b_0 = 3$), and is extended to four slot arrays ($b_1 = 4$) to accommodate more elements. Note that an element to be inserted may be processed by an active slot (that is, a newly added slot). To query the element x, the filtering system must check all of storage slots in its candidate bucket: if a corresponding element fingerprint $\eta_x$ cannot be found in both buckets, the filtering system may return False, indicating that the element x is not a set member; otherwise, the filtering system may return True. A deletion operation for the element x may also check two corresponding candidate buckets, and then the element x is tried to be deleted.

When the filtering system is sparse enough, it is necessary to release an idle space to improve space efficiency. The filtering system in this embodiment uses a global counter c to record a number of stored elements. If $$\frac{c}{m} \leq \overline{T},$$

in which $\overline{T}$ is a threshold when $b=\overline{b}$, then a number of slot arrays in the filtering system is reduced to b (average of b). To this end, the filtering system selects $b-\overline{b}$ slot arrays with least storage elements and reinserts these elements into other slot arrays. The filtering system does not need to access actual content of any element for reinsertion the element, because the index of the candidate bucket is applicable to all of the slot arrays. Specifically, for a bucket where a number of stored fingerprints does not exceed $\overline{b}$, fingerprint on the removed slots in the bucket will be directly stored in its $b-\overline{b}$ empty slots; otherwise, a part of the fingerprint in this bucket must be transferred to their candidate buckets.

Further, given a set of elements, frequency estimation can indicate a number of times that element x appears in the set. For example, in network measurement, a designated router is required to estimate a traffic passing through it. The designated router is a device that provides Wi-Fi and is typically connected to a modem. It sends information from the internet to personal devices like computers, phones, and tablets. After that, tasks such as large flow detection, large flow conversion and entropy estimation are supported by further analysis. For a recommendation system, it is very necessary to record or estimate a number of times users click on a specific product, that is, it is very necessary to record an occurrence frequency (frequency) of data.

Figure 4:
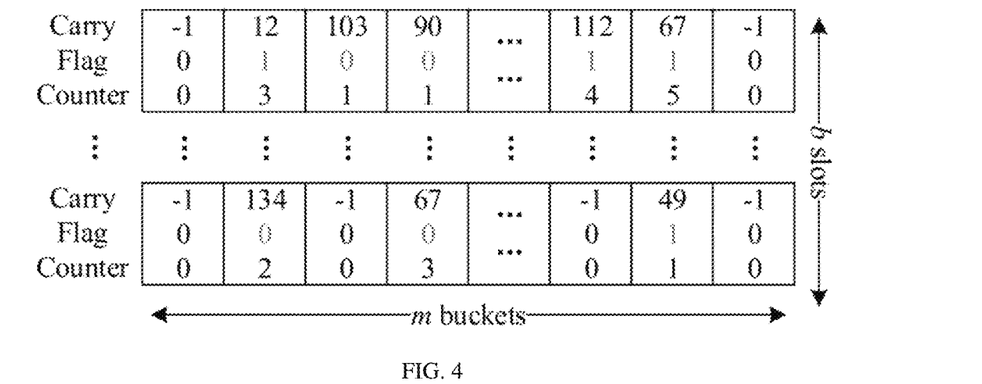
FIG. 4 is another schematic diagram of a filtering system according to an embodiment of the present disclosure.

In this embodiment, each of the storage slots further includes a third domain for recording a frequency of occurrence of a corresponding data element.

the method further includes:
accordingly adjusting a value of the third domain based on a type of the target operation.

For example, the filtering system in this embodiment can accurately record frequency information of storage elements by introducing a count domain (the third domain) in each storage slot, further expanding the filtering system. As shown in FIG. 4, with this design, each slot in the filtering system has three domains, namely, a Carry domain for storing fingerprint information, a Flag domain for marking stored part of the fingerprint, and a counter domain for recording frequency of represented elements.

It is noted that operations in the filtering system may be slightly different from an initial version of the Ark filter. When the element x is inserted, the filtering system still follows a "kick-out and redistribution" strategy. However, the filtering system needs to additionally check whether the element x has been stored in its candidate bucket. If it has been stored, a counter domain in a corresponding slot is just increased by 1; otherwise, all of three domains of the selected slot may be updated. To query frequency of the element x, the filtering system may traverse its two candidate buckets to locate a slot where the element x is located, and then a value of the counter domain of the slot is returned. If the element x is not found, the filtering system returns False. Optionally, the filtering system in this embodiment provides two deletion operations, namely, deleting a copy of the element x or clearing the element x. To delete the copy of the element x, the filtering system finds a location of fingerprint of the element x, and then a corresponding counter domain is reduced by 1. If the counter domain drops to 0, the Carry domain and the Flag domain may also be updated to $-1$ and 0, respectively, indicating that the element x is deleted from the data structure. By contrast, to clear the element x, the filtering system can locate a storage location of the element, then a Carry domain of a corresponding slot is set to be 1, and the counter domain and the Flag domain are made to be zero at the same time. In addition, the filtering system in this embodiment may increase time overhead of element insertion, because it must check whether the element has been stored before storing the element, that is, based on the above time overhead, it can be determined whether the data element has been successfully inserted. However, time overhead of querying and deleting operations in the filtering system is still maintained at a constant level.

For data structure level operations, the filtering system in this embodiment still retains ability to support compression, deduplication and intersection operations between two filtering systems, such as $CAF_A$ and $CAF_B$. However, in performing these operations, CAF must process a value of the count domain, that is, the third domain, accordingly. For any element x, it is assumed that $CAF_A$ and $CAF_B$ contain $f_A(x)$ and $f_B(x)$ copies of the data element x, respectively. After the compression operation is performed, a value of the count domain is updated to $f_A(x)+f_B(x)$. When $CAF_B$ is subtracted from $CAF_A$, the resulting filtering system needs to record $f_A(x)-f_B(x)$ copies of the data element x. On the contrary, a filtering system generated after the intersection operation only keeps $\min\{f_A(x), f_B(x)\}$ copies of the data element x. Of course, according to actual needs, users can customize definitions of these data structure level operations and perform different calculations at a counting-domain level. This design flexibility makes the filtering system universal in many cases. For example, $\max\{f_A(x), f_B(x)\}$ can be used as a counter value of the element x in a compression result. That is, recording rules of values in the count domain can be user-defined.

Besides membership querying, the filtering system in this embodiment can also provide accurate frequency information after the elements are correctly represented. A number of bits required by a counter is often difficult to be determined. Because a too large counter may waste space, and a too small counter may lead to an overflow risk. Basically, a length of the counter is directly determined by an element with largest frequency. The count domain can be optimized by setting length imbalance of counters in storage buckets, so that slots with long counters can store elements with high frequency. That is, there are counters in each domain, and counting ability of the counters can be the same or different, and buckets where counters with long counting ability are located can store elements with higher frequency.

Figure 5:
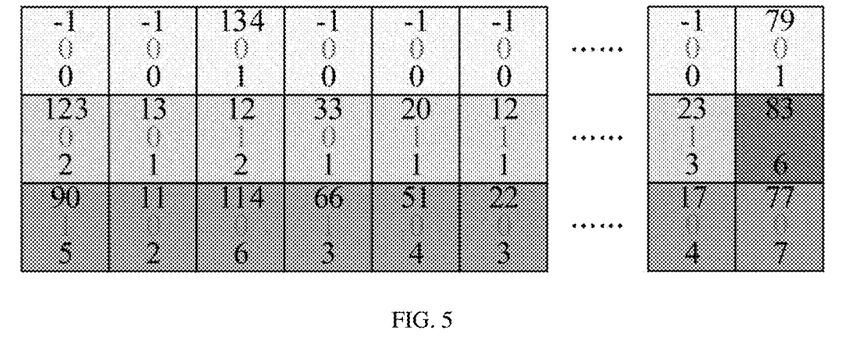
FIG. 5 is a schematic diagram of sorting performed by the filtering system according to an embodiment of the present disclosure.

Optionally, the filtering system in this embodiment also supports:
top-k querying:

The top-k querying can quickly and effectively return top ranked k elements. Values recorded by the count domain in the filtering system can be used for ranking and querying. In order to solve this problem, there are two different methods, that is, sorting when querying and sorting before querying. In a sorting when querying strategy, all the counters in the data structure are sorted, so as to deduce top ranked k data elements in a querying process. This method ensures accurate querying results, and does not cause additional space overhead, but with high time cost. At present, most advanced sorting algorithms, such as TimSort and Quicksort, require time overhead of an order of $O(mb \times \log(mb))$ to sort all of mb counters in the data structure. On the contrary, a sorting before querying strategy maintains an additional maximum (minimum) heap, which dynamically sorts elements according to their counter values. The maximum (minimum) heap only returns its top (last) k elements to answer the querying. This scheme naturally realizes top-k query with accurate and constant time overhead. However, space overhead it introduces conflicts with design concept of data summary technology. Therefore, the above method is either time-consuming or largely space-consuming. Therefore, based on this, a sorting scheme for the filtering system is provided in this embodiment, which includes sorting counters in the buckets and deducing top k elements when querying according to sorted buckets.

Specifically, when an element is inserted or updated, its position in the bucket will be rearranged according to its frequency. The filtering system stores element fingerprints in the candidate buckets in an ascending or descending order. In a descending sorted filtering system, a first slot of each bucket stores an element with a largest counter value, a second bucket thereof stores a second largest counter value, and so on. On the contrary, in an ascending sorted filtering system, the element with the largest counter value is stored in the last slot. Without loss of generality, FIG. 5 shows a simple example of a sorted filtering system. In this example, each bucket has three slots, and elements in each bucket are sorted and stored in an ascending order of frequency. Whenever the counter value changes, a storage bucket will re-sort all the elements it records. For top-k querying, the sorted filtering system has to sort last slots in all m buckets, so as to deduce the top k elements according to top ranked counter values.

In order to improve sorting accuracy, in this embodiment, more slots are searched in the data structure so as to compare more elements before listing results. Generally, $\theta$ represents a number of storage slots searched in a single storage bucket, and then accuracy of querying can be guaranteed based on following theorem.

Theorem 1: in a filtering system with m storage buckets each with B slots, for the top-k querying, when $k \leq \theta$, correct results are returned for the data structure.

Whether the filtering system can return correct query results depends on distribution of top-k elements in the data structure. When $k \leq \theta$, even if all of the top-k elements were stored in one bucket, they could still be successfully retrieved in the data structure.

Theorem 2: when the top-k elements are inserted into the data structure, approximation of expectation maximization of a number of elements stored in a single bucket is:

$$\Gamma^{-1}(m)\left(1 + \frac{\ln(k/m)}{\ln \Gamma^{-1}(m)} + O\left(\frac{1}{\ln^2 \Gamma^{-1}(m)}\right)\right)$$

In addition, when k elements are represented by a filtering system, and $\lambda$ is set as an integer variable and represents a number of elements stored in a bucket, probability of being greater than or equal to $i \in [0, k]$ has a following upper bound:

$$Pr(\max(\lambda) \geq i) \leq m\binom{k}{i}\frac{1}{m^i} \leq m\left(\frac{e \times k}{m \times i}\right)^i$$

based on the above theorem, when $\theta \in [1, b-1]$, probability p that the filtering system returns correct top-k querying results can be calculated as:

$$p = 1 - Pr(\max(\lambda) \geq \theta + 1) \geq 1 - m\binom{k}{\theta+1}\frac{1}{m^{\theta+1}} \geq 1 - m\left(\frac{ek}{m(\theta+1)}\right)^{\theta+1}$$

When $\theta = b$, $p = 1$, all of slots can be traversed and checked to find the top k elements.

To sum up, the filtering system proposed based on above embodiments has higher throughput, better flexibility and more functions. Core idea of the filtering system in this embodiment is to rely on fingerprint of each element to index its candidate bucket. With this design, hash calculation or XOR operations during fingerprint redistribution can be avoided, reducing processing load and improving efficiency. For any data element x, the filtering system calculates the quotient and remainder value of the element relative to its length to index the candidate bucket of the element. In addition, the filtering system in this embodiment can also perform many different types of functions, which enriches functions executed by the filtering system. Theoretical analysis shows that Bpe of the filtering system is not higher than those of existing filtering methods with a same false positive rate. In addition, comprehensive experiments show that the filtering system performs obviously better than the existing filtering methods. In addition, the filtering system can well support dynamic set representation, frequency estimation and top-k querying, with greatly improved performance.

Figure 6:
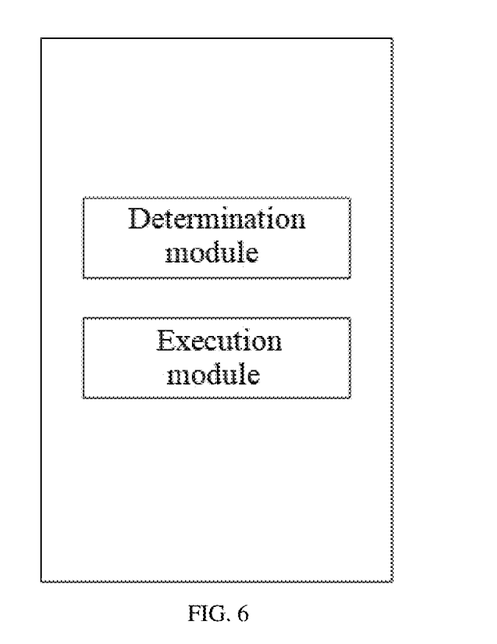
FIG. 6 is a structural block diagram of an apparatus for data filtering according to an embodiment of the present disclosure.

As shown in FIG. 6, an apparatus for data filtering is further provided in another embodiment of the disclosure, which is applied to a filtering system. The filtering system includes m buckets, each bucket including b storage slots, and each storage slot including a first domain and a second domain. The first domain is configured for recording fingerprint information of an element fingerprint of a data element, and the second domain is configured for matching and recording identifiers corresponding to the fingerprint information stored in the first domain. The apparatus for data filtering includes:

a determination module for determining an element fingerprint of a data element to be processed in response to an obtained target instruction; and an execution module for performing a target operation on the data element based on at least the element fingerprint and stored information of the first domain and the second domain in each storage slot, the target operation at least including one or more of inserting, querying and deleting operations.

As an alternative embodiment, the fingerprint information is a quotient value and a remainder value calculated based on a filtering length of the filtering system, and the quotient value and the remainder value corresponding to a same data element are stored in different candidate buckets respectively.

As an alternative embodiment, the target operation is an inserting operation.

the performing the target operation on the data element based on at least the element fingerprint and stored information of the first domain and the second domain in each storage slot includes:

determining the quotient value and the remainder value of the data element based on the element fingerprint and the filtering length;

directly storing the data element in an empty storage slot when there is the empty storage slot in the filtering system, and updating a corresponding first domain and second domain based on the quotient value and the remainder value; or randomly kicking out data in the storage slot so as to store the data element in a vacated storage slot when there is no empty storage slot in the filtering system;

redirecting a kicked-out data element to a new storage slot and storing it, and dynamically adjusting values of the corresponding first domain and second domain at the same time, the new storage slot being formed by kicking out data in another storage slot; and repeating above operations until all data are stored to a maximum extent.

As an alternative embodiment, the target operation is a querying operation.

the performing the target operation on the data element based on at least the element fingerprint and stored information of the first domain and the second domain in each storage slot includes:

determining the quotient value and the remainder value of the data element based on the element fingerprint and the filtering length;

querying a first domain and a second domain stored with the quotient value and the remainder value in the filtering system based on the quotient value and the remainder value; and determining the candidate buckets for storing the data element based on a query result.

As an alternative embodiment, the target operation is a deleting operation.

the performing the target operation on the data element based on at least the element fingerprint and stored information of the first domain and the second domain in each storage slot includes:

deleting data stored in the candidate bucket after determining the candidate bucket in which the data element is stored.

As an alternative embodiment, the target operation further includes an operation of filtering compression or filtering merging of two homogeneous filtering systems.

the method further includes:

determining storage capacity of the two homogeneous filtering systems; and representing data in a filtering system with a relatively small storage capacity in a storage form of a filtering system with a relatively large storage capacity, and performing corresponding storage.

The filtering system can be applied to perform frequency estimation in network measurement for a designated router to estimate traffic passing through the designated router.

As an alternative embodiment, the target operation further includes a filtering deduplication operation for deduplication of same storage elements in two homogeneous filtering systems, and a filtering intersection operation for finding data intersection of entities of or parts of the two filtering systems.

As an alternative embodiment, the apparatus further includes:

a pre-judging module for pre-judging a future storage capacity of the filtering system; and an increasing module for increasing a number of storage slots in parts or all of the buckets based on at least the storage capacity.

As an alternative embodiment, each of the storage slots further includes a third domain for recording a frequency of occurrence of a corresponding data element.

The apparatus further includes:

an adjustment module for accordingly adjusting a value of the third domain based on a type of the target operation.

Figure 7:
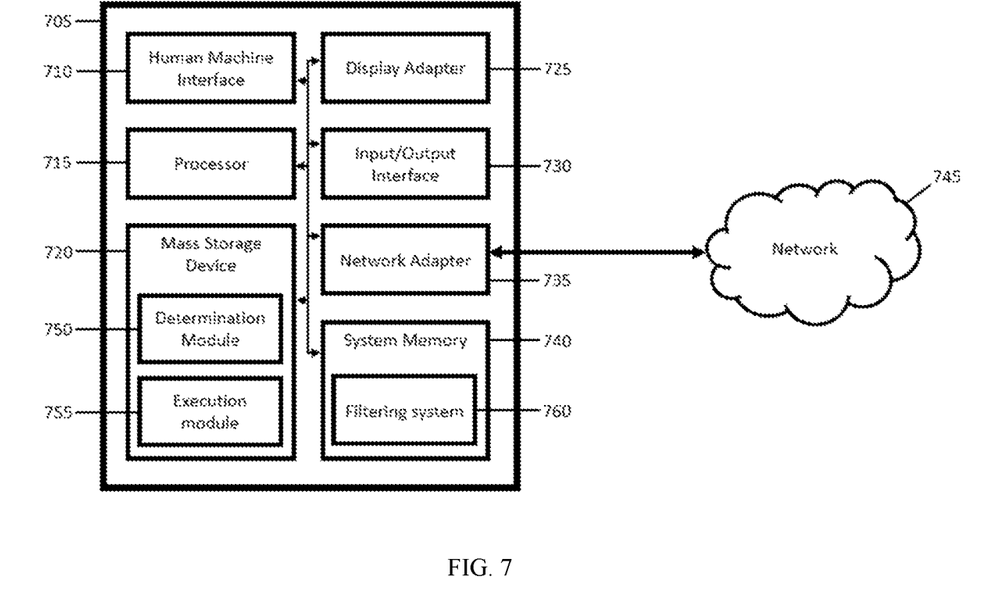
FIG. 7 is a block diagram illustrating an exemplary computing system in which the present system and method can operate provided by an embodiment of the present disclosure.

FIG. 7 is a block diagram illustrating an exemplary computing system in which the present system and method can operate provided by an embodiment of the present disclosure.

Referring to FIG. 7, the methods and systems of the present disclosure may be implemented on one or more computers, such as computer 705. The methods and systems disclosed may utilize one or more computers to perform one or more functions in one or more locations. The processing of the disclosed methods and systems may also be performed by software components. The disclosed systems and methods may be described in the general context of computer-executable instructions such as program modules, being executed by one or more computers or devices. For example, the program modules include operating modules such as Determination Module 750, Execution Module 755, and the like. Determination module 750 is configured for determining an element fingerprint of a data element to be processed in response to an obtained target instruction. The Execution module 755 is configured for performing a target operation on the data element based on at least the element fingerprint and stored information of the first domain and the second domain in each storage slot, the target operation at least including one or more of inserting, querying and deleting operations. These program modules may be stored on mass storage device 720 of one or more computers devices, and may be executed by one or more processors, such as processor 715. Each of the operating modules may comprise elements of programming and data management software.

The components of the one or more computers may comprise, but are not limited to, one or more processors or processing units, such as processor 715, system memory 740, mass storage device 720, Input/Output Interface 730, display adapter 725, network adaptor 735, and a system bus that couples various system components. The one or more computers may implement a wired or wireless network connection at physically separate locations, implementing a fully distributed system. By way of example, without limitation, the one or more computers may be a personal computer, a portable computer, a smart device, a network computer, a peer device, or other common network node, and so on.

Above embodiments are only exemplary embodiments of the present disclosure, and are not intended to limit the present disclosure. Protection scope of the present disclosure is defined by claims. Various modifications or equivalent substitutions can be made by those skilled in the art within spirit and protection scope of the disclosure, which should also be regarded as falling within the protection scope of the disclosure.

What is claimed is:

1. A method for data filtering applied to a filtering system via a processor, the filtering system comprising m buckets, each bucket comprising b storage slots, and each storage slot comprising a first domain and a second domain; the first domain being configured for recording fingerprint information of an element fingerprint of a data element, and the second domain being configured for matching and recording identifiers corresponding to the fingerprint information stored in the first domain, the method for data filtering comprising:
  determining an element fingerprint of a data element to be processed in response to an obtained target instruction; and
  performing a target operation on the data element based on at least the element fingerprint and stored information of the first domain and the second domain in each storage slot, the target operation at least comprising one or more of inserting, querying and deleting operations; wherein
  the filtering system is configured to return correct query results;
  when top-k elements are inserted into the filtering system, approximation of expectation maximization of a number of elements stored in a single bucket is:

$$\Gamma^{-1}(m)\left(1 + \frac{\ln\left(\frac{k}{m}\right)}{\ln\Gamma^{-1}(m)} + O\left(\frac{1}{\ln^2\Gamma^{-1}(m)}\right)\right)$$

when k elements are represented by the filtering system, and $\lambda$ is set as an integer variable and represents a number of elements stored in a bucket, a probability of $\lambda$ being greater than or equal to $i \in [0, k]$ has a following upper bound:

$$Pr(\max(\lambda) \geq i) \leq m\binom{k}{i}\frac{1}{m^i} \leq m\left(\frac{e \times k}{m \times i}\right)^i$$

when $\theta \in [1, b-1]$, probability p that the filtering system returns correct top-k querying results can be calculated as:

$$p = 1 - Pr(\max(\lambda) \geq \theta + 1) \geq 1 - m\binom{k}{\theta+1}\frac{1}{m^{\theta+1}} \geq 1 - m\left(\frac{ek}{m(\theta+1)}\right)^{\theta+1}$$

when $\theta = b$, $p=1$, all of slots can be traversed and checked to find the top k elements;
  where $\theta$ is a number of storage slots searched in a single storage bucket; and
  the filtering system is configured to perform frequency estimation in network measurement for a designated router to estimate traffic passing through the designated router.

2. The method according to claim 1, wherein the fingerprint information is a quotient value and a remainder value calculated based on a filtering length of the filtering system, the quotient value and the remainder value corresponding to a same data element being stored in different candidate buckets respectively.

3. The method according to claim 2, wherein the target operation is an inserting operation; and
  the performing the target operation on the data element based on at least the element fingerprint and stored information of the first domain and the second domain in each storage slot comprises:
    determining the quotient value and the remainder value of the data element based on the element fingerprint and the filtering length;
    directly storing the data element in an empty storage slot when there is the empty storage slot in the filtering system, and updating a corresponding first domain and second domain based on the quotient value and the remainder value; or
    randomly kicking out data in the storage slot so as to store the data element in a vacated storage slot when there is no empty storage slot in the filtering system;
    redirecting a kicked-out data element to a new storage slot and storing it, and dynamically adjusting values of the corresponding first domain and second domain at the same time, the new storage slot being formed by kicking out data in another storage slot; and
    repeating above operations until all data are stored to a maximum extent.

4. The method according to claim 2, wherein the target operation is a querying operation; and
  the performing the target operation on the data element based on at least the element fingerprint and stored information of the first domain and the second domain in each storage slot comprises:
    determining the quotient value and the remainder value of the data element based on the element fingerprint and the filtering length;
    querying a first domain and a second domain stored with the quotient value and the remainder value in the filtering system based on the quotient value and the remainder value; and
    determining the candidate buckets for storing the data element based on a query result.

5. The method according to claim 4, wherein the target operation is a deleting operation; and
  the performing the target operation on the data element based on at least the element fingerprint and stored information of the first domain and the second domain in each storage slot comprises:
    deleting data stored in the candidate bucket after determining the candidate bucket in which the data element is stored.

6. The method according to claim 2, wherein the target operation further comprises an operation of filtering compression or filtering merging of two homogeneous filtering systems; and
  the method further comprises:
    determining storage capacity of the two homogeneous filtering systems; and
    representing data in a filtering system with a relatively small storage capacity in a storage form of a filtering system with a relatively large storage capacity, and performing corresponding storage.

7. The method according to claim 2, wherein the target operation further comprises a filtering deduplication operation for deduplication of same storage elements in two homogeneous filtering systems, and a filtering intersection operation for finding data intersection of entities of or parts of the two filtering systems.

8. The method according to claim 1, further comprising:
  pre-judging a future storage capacity of the filtering system; and
  increasing a number of storage slots in parts or all of the buckets based on at least the storage capacity.

9. The method according to claim 1, wherein each of the storage slots further comprises a third domain for recording a frequency of occurrence of a corresponding data element; and
  the method further comprises:
    accordingly adjusting a value of the third domain based on a type of the target operation.

10. An apparatus for data filtering applied to a filtering system, the filtering system comprising m buckets, each bucket comprising b storage slots, and each storage slot comprising a first domain and a second domain; the first domain being configured for recording fingerprint information of an element fingerprint of a data element, and the second domain being configured for matching and recording identifiers corresponding to the fingerprint information stored in the first domain, the apparatus for data filtering comprising:

- a processor;
- a memory coupled to the processor;
- a determination module for determining an element fingerprint of a data element to be processed in response to an obtained target instruction; and
- an execution module for performing a target operation on the data element based on at least the element fingerprint and stored information of the first domain and the second domain in each storage slot, the target operation at least including one or more of inserting, querying and deleting operations;
- wherein the determination module and the execution module are stored on the memory and configured to be executed by the processor;
- the filtering system is configured to return correct query results;
- when top-k elements are inserted into the filtering system, approximation of expectation maximization of a number of elements stored in a single bucket is:

$$\Gamma^{-1}(m)\left(1 + \frac{\ln\left(\frac{k}{m}\right)}{\ln\Gamma^{-1}(m)} + O\left(\frac{1}{\ln^2\Gamma^{-1}(m)}\right)\right)$$

when k elements are represented by the filtering system, and $\lambda$ is set as an integer variable and represents a number of elements stored in a bucket, a probability of $\lambda$ being greater than or equal to $i \in [0, k]$ has a following upper bound:

$$Pr(\max(\lambda) \geq i) \leq m\binom{k}{i}\frac{1}{m^i} \leq m\left(\frac{e \times k}{m \times i}\right)^i$$

when $\theta \in [1, b-1]$, probability p that the filtering system returns correct top-k querying results can be calculated as:

$$p = 1 - Pr(\max(\lambda) \geq \theta + 1) \geq 1 - m\binom{k}{\theta+1}\frac{1}{m^{\theta+1}} \geq 1 - m\left(\frac{ek}{m(\theta+1)}\right)^{\theta+1}$$

when $\theta = b$, $p = 1$, all of slots can be traversed and checked to find the top k elements;
where $\theta$ is a number of storage slots searched in a single storage bucket; and
the filtering system is configured to perform frequency estimation in network measurement for a designated router to estimate traffic passing through the designated router.

* * * * *